Figure 1:
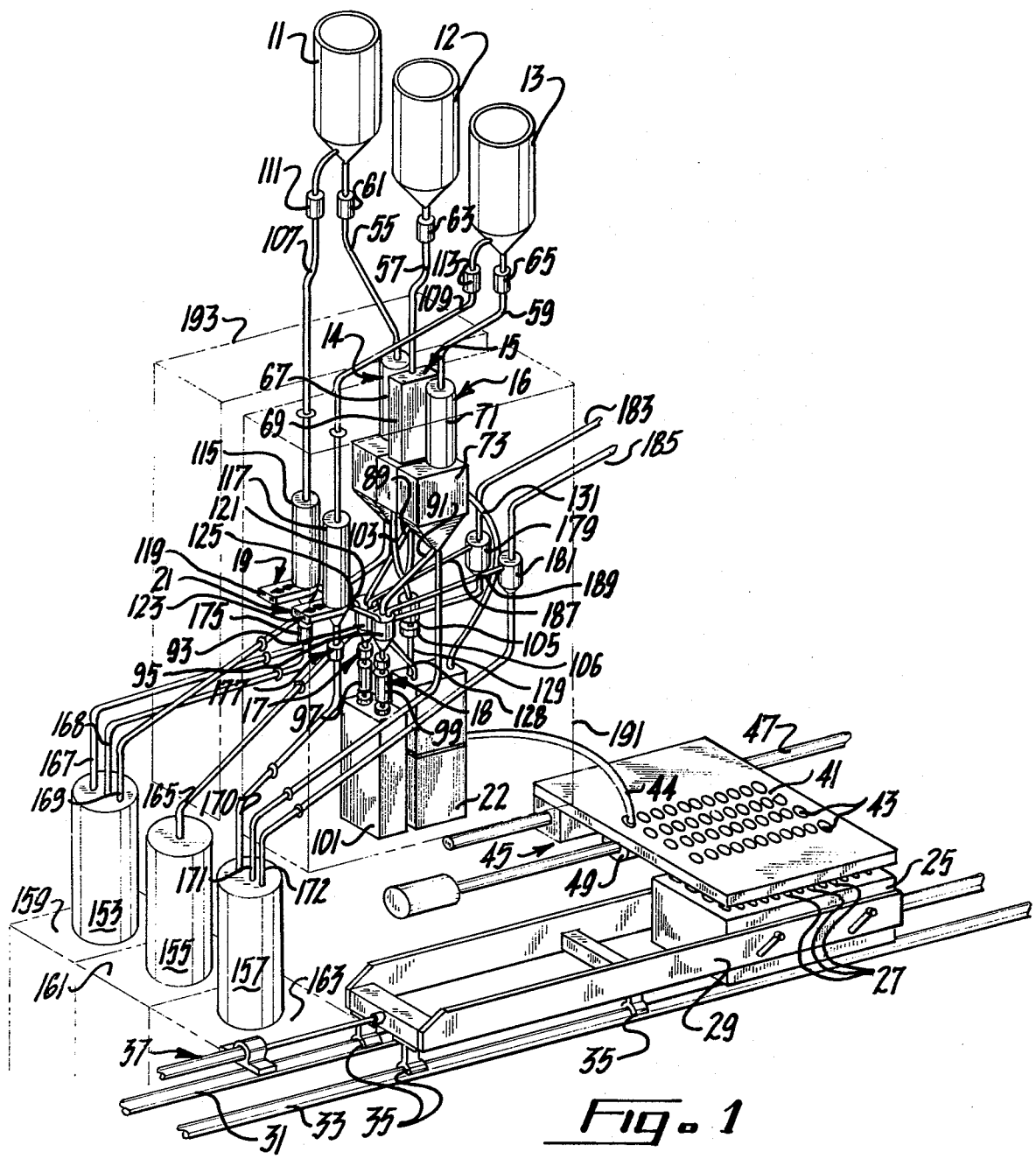

United States Patent [19]

Arya et al.

[11] 4,111,335

[45] Sep. 5, 1978

[54] METERING SYSTEM

[75] Inventors: Satya Prakash Arya; Albert Stevens Ballard; Stephen James Foster, all of San Diego, Calif.

[73] Assignee: General Atomic Company, San Diego, Calif.

[21] Appl. No.: 667,026

[22] Filed: Mar. 15, 1976

[51] Int. Cl.$^2$ ..................... B67D 5/08; G01G 13/00; G01G 17/04
[52] U.S. Cl. .................................... 222/57; 141/105; 141/283; 222/77; 222/132
[58] Field of Search ................ 222/56, 57, 77, 132, 222/129.3, 129.4; 141/102, 105, 128, 129, 283

[56] References Cited

U.S. PATENT DOCUMENTS

| 2,631,827 | 3/1953 | Saxe | 222/56 X |
| 3,109,561 | 11/1963 | Lohse et al. | 141/128 X |
| 3,202,317 | 8/1965 | Fath et al. | 222/132 X |
| 3,404,742 | 10/1968 | Bonneric | 222/77 X |

Primary Examiner—Robert B. Reeves
Assistant Examiner—Fred A. Silverberg
Attorney, Agent, or Firm—Fitch, Even, Tabin & Luedeka

[57] ABSTRACT

A metering system is described for metering quantities of particles, such as fissile, fertile and shim particles for nuclear fuel elements. Predetermined volume discharges from three particle reservoirs are collected and two of them are weighed in comparison with a predetermined standard. A small amount of particulate material is added to each of the two weighed containers dependent upon the difference between the weight of the volumetrically dispensed particles therein and the predetermined standard. All three intermediate containers are then discharged into a volumetric chamber which is then brought to a standard volume by the addition of further particles. The resultant charge in the volumetric chamber is comprised of a fixed volume in which the weight of particles from two of the three reservoirs is standardized.

6 Claims, 2 Drawing Figures

METERING SYSTEM

This invention relates to metering systems and, more particularly, to a particle metering system which automatically and accurately measures and dispenses desired quantities of two or more different types of particulate materials.

For various purposes, it may be desirable to automatically measure and dispense specific quantities of different types of particulate material. For example, in the pharmaceutical industry, the explosives industry, the chemicals industry, and the nuclear industry, it may be necessary to fill containers, mold cavities or the like with mixtures of several different types of particulate material. Where the materials are dangerous due to their toxicity, radioactivity, or the like, or where absolute sterility must be maintained, it may be desirable that such metering and dispensing be accomplished entirely automatically.

By way of more specific example, in the production of certain types of nuclear fuel rods, the fuel components used are fissile, fertile and shim particles. These particles may be embedded in a matrix material of cured graphite. Typically, in such rods the particles are dispensed into a mold cavity where a fluidized binder material is injected to form the fuel rod.

Since the quantity by weight of the fissile and fertile material in each of the fuel rods is important to the quality control of the fuel rods, and since the total volume of particles is important in the molding process, automated metering equipment should be capable of accurately weighing the said quantities of fissile and fertile particles and of adding shim particles volumetrically to bring the total particle charge to a fixed volume. Naturally, high accuracy is required in such equipment and the need for reliability is comparably high.

It is an object of the present invention to provide an improved automated particle metering system.

Another object of the invention is to provide an automated metering system which automatically and accurately measures desired quantities of particulate material.

A further object of the invention is to provide a particle metering system capable of dispensing two or more different types of particulate materials wherein at least one is metered by weight and the other by volume.

A further object of the invention is to provide an automated nuclear fuel particle metering system capable of weighing set quantities of fissile and fertile particles and adding shim particles volumetrically to bring the total particle volume to a fixed level.

Figure 2:
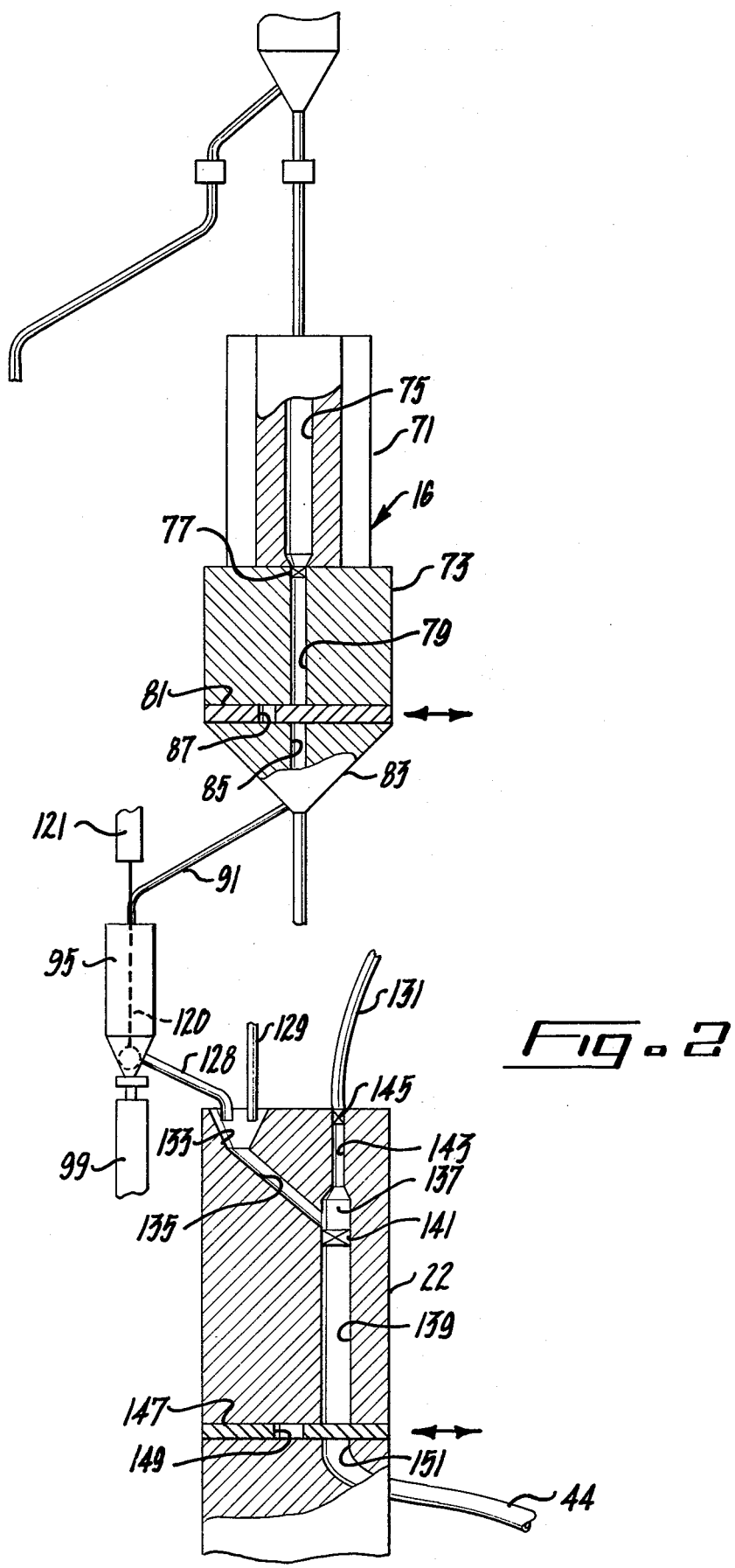

Other objects of the invention will become apparent to those skilled in the art from the following description, taken in connection with the accompanying drawings wherein:

FIG. 1 is a schematic perspective view of a metering system constructed in accordance with the invention; and FIG. 2 is a partial schematic side view, with portions shown in section, of the apparatus of FIG. 1.

Very generally, one form of the particle metering system of the invention comprises first, second and third particle reservoirs 11, 12 and 13 and coarse feeder means 14, 15 and 16 for dispensing a measured volume of each of first, second and third types of particles from each of the reservoirs, respectively. Means 17 and 18 are provided for weighing the particles dispensed in the measured volume from two of the reservoirs 11 and 13 to provide a predetermined combined weight for the particles dispensed therefrom. Fine feeder means 19 and 21 dispense an amount of particles (based on timed flow) sufficient to provide a predetermined combined weight for each of the particles dispensed from the reservoirs 11 and 13. Weighing cups 93 and 95 receive the particles from the coarse feeder means, 14 and 16, and from the fine feeder means 19 and 21. A volumetric chamber 22 receives the particles from the cups 93 and 95 and from te coarse feeder 15. The chamber establishes the volume of total particles in accordance with a predetermined limit.

Referring now more particularly to the drawings, the system illustrated therein is for the purpose of manufacturing fuel rods of the type wherein fissile, fertile and shim particles are embedded in a graphite matrix. A mold, not shown, has a plurality of mold cavities in which particulate material blends of fissile, fertile and shim particles are placed. A pitch containing matrix material is injected into the mold cavities to form green fuel rods of a specified length, diameter, homogeneity and other applicable specifications. These rods are then inserted into holes in specially shaped graphite blocks which, in turn, comprise the fuel elements which make up a reactor core.

For the purpose of transferring the charges of mixed particulate material to the mold, a blender 25 is employed. The blender 25 is a block of suitable material having a plurality of cavities 27 therein which correspond in location to the mold cavities in the unillustrated mold. The blender 25 is mounted in a frame 29 which is slidably carried on a pair of guide rods 31 and 33 by a plurality of sliding guides 35 depending from the frame 29. A d.c. motor and ball screw drive mechanism 37 attached to the frame 29 moves the blender 25 linearly along the guide rods 31 and 33.

When the cavities 27 in the blender 25 are filled with the proper mixture of particulate material, a plurality of short air pulses is applied to each cavity through an internal manifolding system and external air connections, not shown. This series of short air pulses blends the particulate material in the individual cavities to produce homogeneity of particle distribution. Suitable means, not shown, may be provided for varying the duration of the air pulses and the interval between pulses from one blend to another. On completion of the air blending operation, the drive mechanism 37 moves the blender 25 along the tracks or rods 31 and 33 to be positioned over the unillustrated mold for depositing the contents of the cavities 27 in the mold cavities, not shown.

For the purpose of filling the blender 25, a transfer tray 41 is employed. The transfer tray 41 includes a plurality of transfer cavities 43 and is positionable in accordance with cartesian coordinates on a suitable tape controlled x-y positioning mechanism 45. The tape controlled x-y positioning mechanism 45 includes a guide system 47 and suitable stepping motor and ball screw drives 49 as is known in the art.

When the cavities 43 and the transfer tray 41 are filled as will be described, the transfer tray is positioned over corresponding cavities 27 in the blender 25 and the contents of the cavities 43 are discharged into the corresponding cavities 27. A suitable slide gate valve, not shown, is provided on the transfer tray for discharging the contents of the cavities 43.

By means which will be described, the system of the invention operates to fill the cavities 43 in the transfer tray 41, in the illustrated case two at a time, through fill tubes 44, one of which is shown. The cavities are indexed to the proper position by the x-y mechanism 45.

The first, second and third particle reservoirs 11, 12 and 13 of the metering system are of suitable design. The reservoir 11 is for containing fissile material, the reservoir 12 is for containing shim material, and the reservoir 13 is for containing fertile material. The particulate material in the reservoirs or hoppers 11, 12 and 13 may be replenished from time to time as needed by suitable manual or automatic means, not illustrated. The particulate material falling from the reservoirs 11, 12 and 13 passes downwardly by gravity into the coarse feeders 14, 15 and 16, respectively, through tubes 55, 57 and 59, respectively. Control over the falling material is maintained by air operated pinch valves 61, 63 and 65, respectively.

The coarse feeders 14, 15 and 16 include hoppers 67, 69 and 71, respectively, mounted on feeder mechanism housings 73. In FIG. 2, some of the internal aspects of one of the coarse feeders 16 may be seen. The hopper 71 is mounted above the feeder mechanism housing 73 and has an internal chamber 75 which communicates through a pinch valve 77 with a chamber 79 internally of the housing 73. The lower end of the chamber 79 is closed by a sliding plate valve 81. The tapered lower section 83 of the housing 73 contains an internal passage 85 through which the charge contained in the chamber 79 falls when the opening 87 in the plate valve 81 is aligned therewith. The other coarse feeder mechanisms 14 and 15 are of similar internal construction.

The coarse feeders 14 and 16 discharge through connecting tubes 89 and 91 into weighing cups 93 and 95, respectively. The weighing cups 93 and 95 are supported on weighing sensors 97 and 99, respectively. The weighing sensors, in turn, are supported on a housing 101.

The coarse feeder 15 discharges through a tube 103 to a holding chamber 105 which is supported at approximately the same level as the weighing cups 93 and 95.

The particulate material falling from the reservoirs 11 and 13 also passes downwardly by gravity into the fine feeders 19 and 21, respectively, through tubes 107 and 109, respectively. Control over the falling material is maintained by air-operated pinch valves 111 and 113, respectively. The fine feeders 19 and 21 include hoppers 115 and 117, respectively, in which the material falling from the reservoirs 11 and 13 is accumulated. The hopper 115 discharges through a vibratory feeder mechanism 119 and a discharge tube 121 into the weighing cup 93. Similarly, the hopper 117 discharges through a fibratory feeder mechanism 123 and a discharge tube 125 into the weighing cup 95.

The weighing cups 93 and 95 discharge through tubes 128, only one of which is shown, into the volumetric chamber 22. A ball valve 120, shown only in FIG. 2, is positioned at the upper end of each of the tubes 128 for controlling flow therethrough. The ball valves are activated by a pneumatic cylinder 121, also shown only in FIG. 2. The holding chamber or cup 105 also discharges into the volumetric chamber through a tube 129, controlled by a pinch valve, not shown. A tube 131 communicates directly from the coarse feeder hopper 69 to the volumetric chamber 22.

The internal aspects of the volumetric chamber 22 may be seen in FIG. 2. Material from the weighing cups 93 and 95 enters the volumetric chamber through the tubes 128 discharging into a funnel 133. A passage 135 connects the funnel 133 with a space 137 located above a volume chamber 139. The space 137 is separated from the volume chamber 139 by a pinch valve 141. The size of the volume chamber 139 may be made adjustable by suitable means, not illustrated. The tube 131 communicates with an internal passage 143 through a pinch valve 145. The passage 143 communicates with the space 137 above the pinch valve 141. The lower end of the volume chamber 139 is closed by a sliding plate 147. When the opening 149 in the sliding plate 147 registers with the volume chamber 139, the contents of the volume chamber are discharged through a passage 151 into the tube 44.

For the purpose of collecting unused fissile, fertile, and shim particles separately, a particle drainage system is provided. The particle drainage system includes three fixed temporary storage containers 153, 155 and 157, for fissile, shim, and fertile material, respectively. Underneath are three removable containers indicated generally at 159, 161 and 163, into which the material in the temporary containers may be drained, respectively, by operation of suitable air pinch valves, not shown. Unused shim material is collected in the temporary reservoir 155 by means of a drainage tube 165. The drainage tube 165 connects with the coarse feeder 15. The temporary reservoirs 153 and 157 are each provided with three drainage tubes 167-169 and 170-172, respectively. The tubes 169 and 171 connect with the coarse feeders 14 and 16, respectively. The tubes 168 and 170 connect through pinch valves 175 and 177, respectively, to the fine feeders 19 and 21, respectively. The tubes 167 and 172 connect with vacuum retrievals 179 and 181, which are, in turn, connected to a vacuum system, not shown, through tubes 183 and 185. Tubes 187 and 189 connect the vacuum retrievals 179 and 181, respectively, to the weighing cups 93 and 95.

The aforegoing described components are contained in a modular housing 191. A similar modular housing 193 is provided adjacent thereto containing identical components and with an additional fill tube 44, not shown, so that two of the holes or chambers 43 in the tray 41 may be filled simultaneously as previously mentioned.

In operating the foregoing described apparatus, all of the operating functions are preferably controlled automatically by a suitable control electronic system, not illustrated. All air pinch valves preferably are operated by three-way normally open solenoid valves. All slide valves and gates are preferably operated by air cylinders controlled by three-way normally closed solenoid valves.

In operating the apparatus of the invention, the hoppers 11, 12 and 13 may be provided with suitable level sensors which indicate when the hoppers should be filled up with fresh particles. From the feed hoppers, the particles flow by gravity into the coarse and fine feeder hoppers, namely, the hoppers 67, 69 and 71, and the hoppers 115 and 117. When the air pinch valve controlling the reservoirs 67, 69 and 71 are open, the particles flow by gravity into the internal chambers within the coarse feeders 14, 15 and 16. After allowing the chambers to fill, the pinch valves corresponding to the valve 77 shown in FIG. 2 close. The volume of the chambers can be varied independently, for example by provision, not shown, for moving the upper half of each coarse feeder relative to the bottom half. The control electronics, not shown, hold the valves open for a fixed period of time enough to fill the largest chamber volume.

To complete the coarse feeding operation, the volume of the chambers inside the coarse feeders is adjusted by the three adjusting motors (not shown, one for each coarse feeder) so that the weight of the charge is within +0, −1 percent of the required weight of the charge, for example. The tolerance limits are set so that the weight of the particles during this time period corresponds to slightly less than the desired final weight. During this period, fissile and fertile particles flow by gravity into the weighing cups 93 and 95. Shim particles from the coarse feeder 15 flow into the temporary reservoir 105 and are retained therein by a suitable air pinch valve 106. After the predetermined time period, the slide valves in the coarse feeders are closed and the above described coarse feeding cycle is repeated for the next charge.

The weighing sensors 97 and 99 sense the coarse weight of the fissile and fertile particles in the cups 93 and 95. This is processed by the scale electronics, not shown, and sent to the unillustrated controlling circuitry. The coarse weight is compared with a predetermined standard and the difference is converted into a time for the fine feeders 19 and 21 to run to make up the difference between the weight of the particles in the weight cups and the predetermined standard. Upon suitable command, the vibratory feeders 119 and 121 are energized to feed the particulate material from the reservoirs 115 and 117 for the time required to make up the necessary weight difference in the cups 93 and 95. After this has occurred, the vibratory feeders cease the discharge. Once again the weighing sensors 97 and 99 sense the weight of the particles in the cups 93 and 95 and this weight is again compared to the predetermined standard.

If the second sensing of the weight in the cups is not within predetermined limits to the predetermined standard, suitable valves, not shown, are operated to open the tubes 187 and 189 and cause the vacuum retrieval system to operate to draw the particles into the containers 179 and 181. From thence, the particles flow through the tubes 167 and 172 to the respective containers 153 and 157.

If the final or second sensing of the weight is within the proper limits, the ball valves 120 in the weight cups are open to permit the particles in the weighing cups 93 and 95 to flow into the volumetric chamber 22. At the same time, the pinch valve 141 in the volumetric chamber is also open. After a suitable period of time, the ball valves 120 are closed and the previous cycle is repeated for the next charge.

In order to bring the charge within the volume chamber 139 of the volumetric chamber 22, the valve 145 is open to allow shim material to flow into the chamber 139. The time period for which the valve 145 is open is fixed and is equal to the time necessary to fill the largest contemplated volume of the top off shim material. After this predetermined period of time, the valve 145 closes and the valve 141 also closes. The slide valve 147 then opens to allow the contents of the chamber 139 to flow through the hole 149, the passage 151, and the tube 44 into the particular transfer tray hole 43 located at the lower end of the tube. The slide then returns to the closed position and the cycle is repeated.

The transfer tray indexes each of the holes 43 underneath the lower ends of the tubes 44. Each of the holes is therefore filled with a charge. The tray holes are filled in rows of two, and once each row of two holes is completely filled, the tray is indexed over to align the next row of two holes under the ends of the tubes 44. At the completion of the filling of the holes in the transfer tray, the transfer tray is moved to a position where the holes 43 are directly aligned with the holes 27 in the blender 25. The unillustrated slide valve then opens, dumping the contents of the holes 43 into the respective holes 27. The blender 25 is then moved to the next position (not shown) to mix the individual charges by air blending and then drop the charges into the mold of an injection molding machine (not shown).

In the event different types of materials are to be loaded into the blender 27, the appropriate valves are opened in the retrieval or drainage system and the particles remaining in the hoppers 115, 117, 67, 69, 71, 11, 12 and 13, 93 and 95 are all passed into the receptacles 153, 155 and 157. These receptacles are then emptied into the removable containers 159, 161 and 163 and these are then replaced with empty containers.

The system of the invention provides a number of significant advantages. The system may be totally automated and is capable of metering approximately 900 charges per hour. The system may be designed to weigh the charges to an accuracy of plus or minus 0.1% by weight. Because the flow of particles through the system is by gravity, a minimum number of moving parts are necessary to increase reliability and simplicity. In addition to careful control of the weight of the components, close control over the combined charge volume is also possible. Because primarily air pinch valves and slide gates control the flow of particles, damage to the particles is minimized due to the relative gentleness of pinch valves and because the return action of the slide valves is when there are no particles in the slide passage. The system combines weight and volumetric dispensing with high accuracy.

It may be seen, therefore, that the system provides an improved automated particle metering system which automatically measures desired quantities of particulate material of two or more different types wherein at least one or all are metered by weight and the other or none by volume. The invention is particularly adaptable to the handling of nuclear fuel particles wherein set quantities of fissile and fertile particles may be metered by weight and wherein shim materials may be metered volumetrically to bring the total volume to a fixed level, or wherein set quantities of fissile, fertile and shim (all three) may be metered by weight.

Various modifications of the invention in addition to those shown and described herein will become apparent to those skilled in the art from the foregoing description and accompanying drawings. Such modificatios are intended to fall within the scope of the appended claims.

What is claimed is:

1. A particle metering system comprising, first, second and third particle reservoirs, coarse feeder means for dispensing a predetermined volume of first, second and third types of particles from each of said reservoirs, respectively, means for weighing the volumetrically dispensed particles from said first and second reservoirs, first and second fine feeder means for dispensing an additional amount of first and second particles sufficient to equal a predetermined weight for each of the first and second particles, a volumetric chamber for receiving the first, second and third types of particles from said coarse feeder means and said first and second fine feeder means, means for volumetrically dispensing the third type of particles to said volumetric chamber in a quantity sufficient to establish a predetermined total volume of particles therein, and a particle drainage system and retrieval means for transporting the first and second particles to said drainage system when the weight of the volumetrically dispensed particles thereof is outside a predetermined range.

2. A particle metering system according to claim 1 wherein said weighing means comprise first and second containers for receiving the volumetrically dispensed charges of first and second particles, respectively, from said coarse feeder means and said first and second fine feeder means, and weight sensing means for sensing the difference between the full and empty weights of each of said first and second containers.

3. A particle metering system according to claim 1 including means for transferring and dispensing the contents of said volumetric chamber to a blender cavity.

4. A particle metering system according to claim 3 wherein a blender forms a plurality of said blender cavities, said transferring and dispensing means comprising a dispenser, a transfer tray having a plurality of transfer cavities, means for successively positioning said transfer cavities for loading by said dispenser, and means for moving said transfer tray to the blender for discharging the contents of each of said transfer cavities to a respective one of the plurality of blender cavities.

5. A particle metering system according to claim 1 wherein said first and second coarse feeders, and said first and second fine feeders operate by gravity flow.

6. A particle metering system according to claim 5 wherein said first and second fine feeders include vibratory means to enhance particle flow.

* * * * *